Sept. 13, 1955 R. V. ANDERSON 2,717,918

COLOR TELEVISION RECEIVER FILTER SYSTEM

Filed July 24, 1952 4 Sheets-Sheet 1

INVENTOR.
ROBERT V. ANDERSON

BY H. A. Mackey

ATTORNEY.

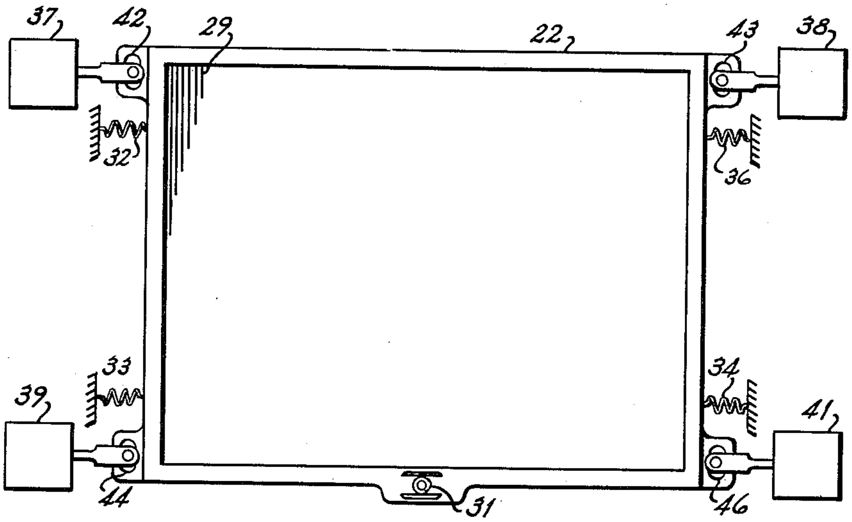
FIG. 5
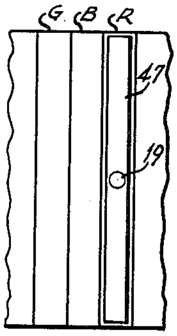
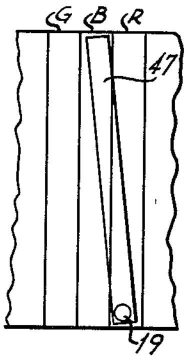
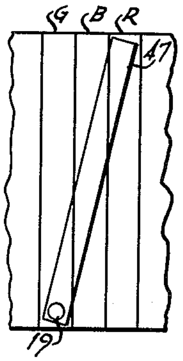
FIG. 6a FIG. 6b FIG. 6c
INVENTOR.
ROBERT V. ANDERSON
BY H. A. Markey
ATTORNEY.

Sept. 13, 1955 R. V. ANDERSON 2,717,918

COLOR TELEVISION RECEIVER FILTER SYSTEM

Filed July 24, 1952 4 Sheets-Sheet 3

INVENTOR.
ROBERT V. ANDERSON
BY H. L. Mackey
ATTORNEY.

INVENTOR.
ROBERT V. ANDERSON
BY H. A. Mackey
ATTORNEY.

United States Patent Office 2,717,918
Patented Sept. 13, 1955

2,717,918

COLOR TELEVISION RECEIVER FILTER SYSTEM

Robert Vincent Anderson, Pleasantville, N. Y., assignor to General Precision Laboratory Incorporated, a corporation of New York Application July 24, 1952, Serial No. 300,739

2 Claims. (Cl. 178—5.4)

This invention relates to color television receiving systems and more particularly to color filters for television image projection systems.

In conventional black and white television receivers of the projection type a small cathode ray picture tube is positioned to project its light through an optical system upon a small viewing screen. The optical system may consist merely of the picture tube's luminescent screen as the light source, a lens to direct the light from this screen, and a translucent viewing screen to receive the focused light upon one side and to be viewed from the other side.

In such a system, as well as in more complex arrangements such as the Schmidt system, the picture is drawn or scanned upon the image plane at the viewing screen by a small light spot that moves from side to side to scan horizontal lines, and proceeds from top to bottom of the screen to scan successive fields. Thus at any particular instant only a single picture element the width of the light spot is illuminated on the viewing screen, persistence of vision producing the effect of a complete picture. The light beam at the viewing screen has a width of only one picture element, which on a 15 inch by 20 inch screen is about 1/25 inch.

Although the light spot is only the width of a single picture element at the picture screen it occupies the entire area of the intervening lens.

In one conventional method of color television transmission three primary additive colors are employed, red, blue and green, and the intensities of successive fields are made proportional to the color values in the subject televised in the order named. Therefore, in the receiver filters of red, blue and green are successively interposed to mix the colors in the proper proportions so that the overlapping successive fields of the picture simulate the natural colors of the televised subject. This is termed the sequential field method. The color filters may be placed anywhere in the light path between the picture tube and the viewing screen and the sequential movement of these color filters is usually effected by mechanical means. The filters are frequently arranged in the form of a sectored disc which is rotated about its center and the disc is frequently positioned in the beam adjacent the lens. At this location, however, substantially the entire area of the lens is used at all times during scanning, and therefore light rays from the entire area of the lens must be controlled by the filter, and all changes of filter color must be made during non-scanning periods, that is, during the vertical blanking times.

On the other hand, if the filter be applied at or near the image plane on the viewing screen the only part of the image that must be controlled by the filter at any instant is the small spot that is under illumination at that instant. The instant invention provides a way of doing this, the time available for changing from one filter color to another thus not being restricted to the vertical blanking time. This is accomplished by providing a color component light-directing assembly for maintaining a progressing zone of coincidence between the elemental area of luminosity on the cathode ray tube screen, which luminosity results from the bi-dimensional orthogonal scanning of the electron beam and represents elemental picture areas, and the primary color filter screens which are cyclically changed with the picture fields and repeated in synchronism with the picture frames. Each picture field is composed of at least one complete scansion and is filtered through a single primary color screen and the successive picture fields of the same picture frame are filtered through color screens of the other respective primary colors the additive color values of the different fields giving a composite picture frame simulating the color values of the object field.

Briefly, the invention provides a transparent filter sheet interposed in the incident light preferably contiguous to the viewing screen. The filter sheet may contain elements of two or more colors, according to the color television system employed, but it is preferred to use three colors and to employ elements colored red, blue and green. A plate containing numerous small condensing lenses is placed adjacent the illuminated side of the filter sheet, the lenses being so positioned that, depending on the relative positions of the lens plate and the filter sheet, to a first approximation are all focused on either all red, all blue, or all green elements. Therefore, by small relative displacements of the sheet and plate all of the incident light seen by the viewer is at any instant either red, blue, or green light. This relative displacement of the sheet and plate is effected electromechanically in accordance with an electric current that is made to vary in a suitable manner, the variations of the current being synchronized with the movement of the picture tube light beam through control by the vertical synchronizing pulses derived from the television receiver.

The principal object of this invention is to provide improved means for controlling the color components of a television scanning light beam in which the movement of the filter elements is not limited to the blanking intervals.

More specifically, the object of this invention is to provide an improved relative arrangement of filter and optical elements adjacent the viewing screen thus permitting movement of the filter covering one part of the screen when the scanning light spot impinges on another part of the screen.

A further understanding of this invention may be secured from the following detailed description and associated drawings, in which.

Figure 3:
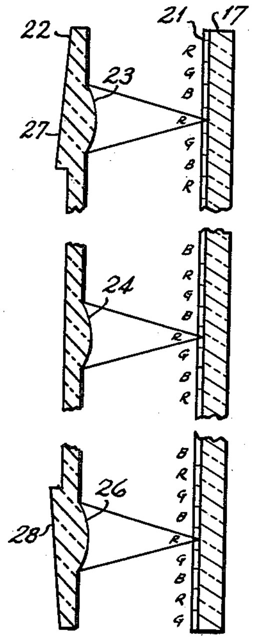
Figure 4:
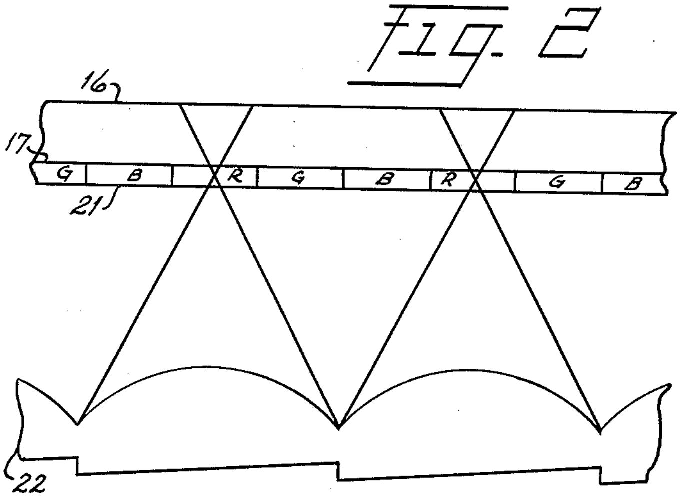
Figure 7:
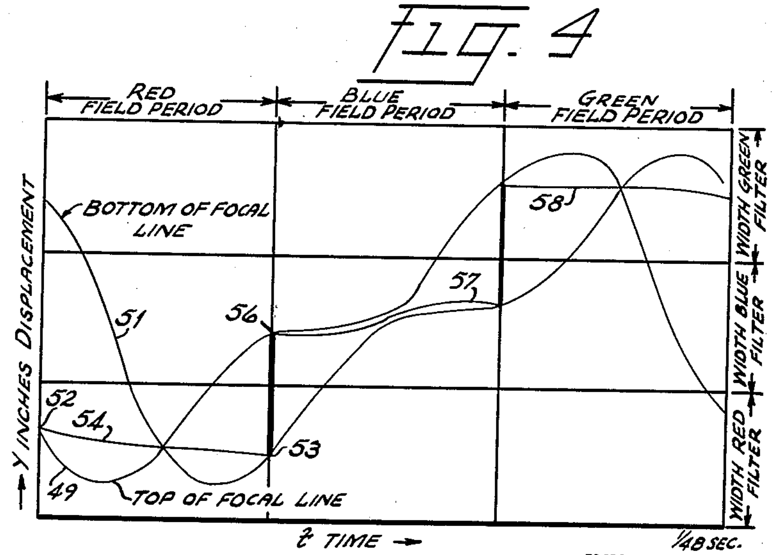
Figure 8:
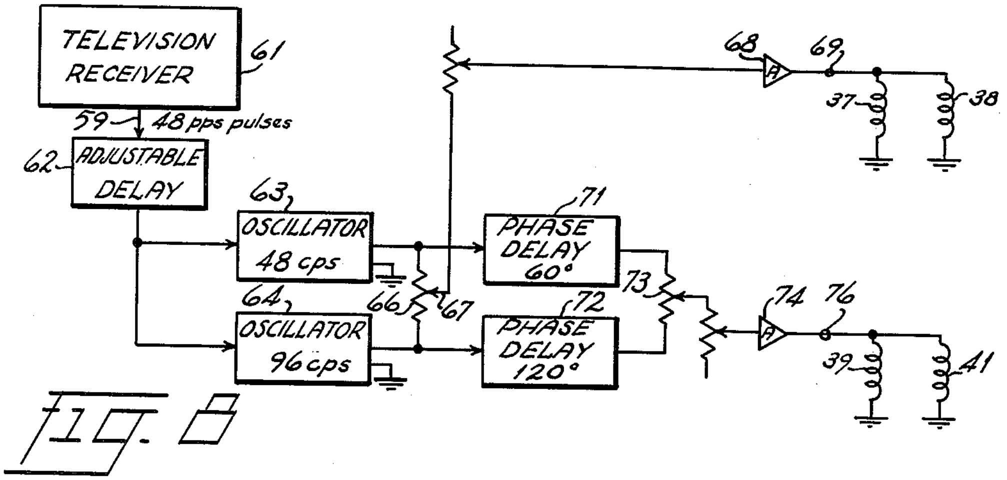

Figures 3 and 4 schematically depict in plan view portions of the cylindrical lens plate with filter and viewing screen;

Figure 5 illustrates the mounting of the cylindrical lens plate;

Figures 6*a*, 6*b*, and 6*c* schematically indicate the movement of one cylindrical lens relative to the filter;

Figure 7 graphically depicts the movement of the cylindrical lens plate;

Figure 8 is a schematic wiring diagram of a circuit for actuating the cylindrical lens plate solenoids; and Figure 9 to 12 inclusive, illustrate a modified form of the invention.

Figure 1:
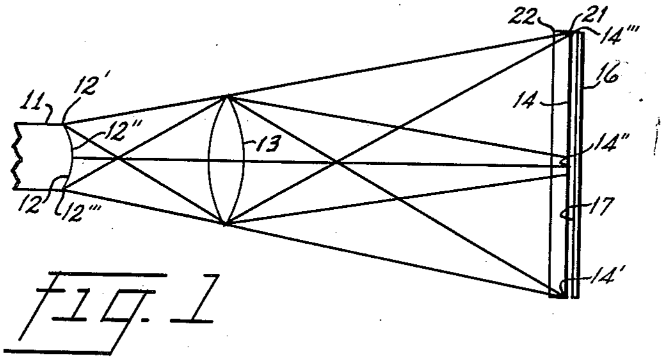
Figure 1 is a general schematic view of the optical system of a projection type television receiver.

Referring now to Fig. 1, the optical projection system of a projection type television receiver is schematically indicated, comprising a small cathode ray picture tube 11 having a luminescent screen 12 which emits light as the cathode rays scan it. The cathode ray tube 11 is a conventional video unit and the video receiving system with which it is to be used has means for providing and scanning an electron beam along orthogonal coordinates at widely different frequencies so that the beam makes several horizontal oscillations for every vertical oscillation, in accordance with conventional practice in video systems. The period of the vertical sweep represents one picture field and three picture fields constitute one picture frame. Each picture field represents, respectively, the color values of the three primary colors, red, blue and green, which when superimposed in the picture frame simulates the color of the object field. Thus light is emitted from the area of luminosity on the screen 12 in the course of the scanning process sequentially from all points of the screen including points 12′, 12″, and 12‴. A focusing system, which may be of any type, is schematically represented by the lens 13 having the function of focusing the light from the luminous scanned points of screen 12 on a larger viewing screen 14. This screen in home television sets may, for example, have a height of 15 inches and a width of 20 inches. On it is reproduced to larger scale the luminous picture appearing on the picture tube screen 12. For example, the light rays from point 12′ are focused by the lens 13 to the size of a picture element at the screen point 14′, a picture element on this size of screen spanning about 1/25 inch. The viewing screen 14 is translucent and is viewed at its outer viewing surface 16 by the observer.

Figure 2:
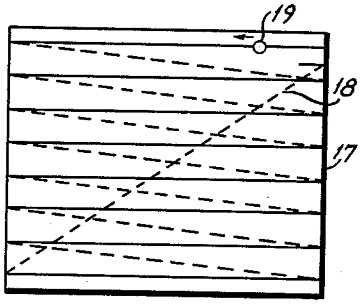
Figure 2 illustrates the path of a scanning light beam across a projection screen.

The progress of the beam of light as it scans the image plane surface 17 of the screen 14 is as shown in Fig. 2, starting at the top and scanning from right to left (left to right facing the viewing surface 16) executing about 187 lines from top to bottom of the field in one system of color television then returning while dark, during the vertical blanking period, to the top of the screen as is schematically indicated by the dashed line 18. The next set or field of horizontal lines is interlaced with the previous set so that the vertical linear definition is approximately 1/375 of the screen height. The field period is 1/144 second. Successive fields are red, blue, and green, so that three fields are required to portray all three colors in 1/48 second, to produce one picture frame.

The focused spot of light produced by the beam is represented in one position as a spot 19 as it moves from right to left in Fig. 2 drawing the top horizontal line of the projected picture. The size of this spot of light is substantially that of the basic picture element and therefore has a span of only about 1/25 inch. At any instant only one such area on the entire viewing screen is illuminated while all of the remainder of the screen is unilluminated by the light from the picture tube. Therefore any masking opeartions or filter movements or substitutions that may take place at any part of the surface area of the viewing screen that is not at the time illuminated cannot be seen by the observer and has no effect whatever upon the projected picture.

Near the image surface 17 of the screen 14, Fig. 1, and parallel to it there is placed a filter 21 consisting of a transparent or translucent sheet having vertically disposed filter elements arranged in repeated series of colors red, blue, and green. Each vertical color strip is about 1/75 inch wide so that each set of three is about the width of one picture element. Between the filter 21 and the condensing lens 13 there is placed a lens plate 22 provided with a plurality of cylindrical lenses, 23, 24 and 26 with their axes extending vertically, all similar and preferably having an approximately parabolic cross section. Because of the presence of the filter and lens plate 22 the lens 13 is not focused exactly on the image plane 17, but is so focused that the light beam just spans the width of one cylindrical lens. The distances between the condensing lens 13, the lens plate 22, filter 21 and the image surface 17 are such that the light proceeding from each cylindrical lens in the lens plate 22 substantially spans the width of one filter color strip and falls on the image surface 17 with a width of about 1/75 inch, or one-third of one picture element. This is illustrated in Fig. 3 in which one cylindrical lens 23 near one side of the lens plate 22 is shown in cross section, with a second lens 24 at the middle and a third 26 at the other side of the lens plate. The rays from the condensing lens 13 are substantially parallel to the optical axis of the cylindrical lens 24 but the rays from the lens 13 are oblique to the optical axes of the lenses 23 and 26. To compensate for this, Fresnel lenses 27 and 28 are provided to make the emerging rays from the lenses 23 and 26 symmetrical about the respective optical axes of the latter. The optical axes of the lenses 23, 24 and 26 are normal to the plane of the image surface 17.

The operation of the cylindrical lenses of the lens plate 22 is schematically illustrated in Fig. 4. If the lens plate 22 be shifted to the left all of the focused light from all lenses in the portion of the lens plate illustrated will be shifted from the red filter strips R, to the blue strips B, and if the lens plate 22 be shifted still further the light is diverted to the green strips G. Thus by shifting the lens plate 22 sideways the color of the picture elements seen by the observer is changed and may at will be made either red, blue or green.

It follows that in order to produce colored images it is only necessary to shift the lens plate in synchronism with the color components of the transmitted signal. Since all colors are combinations in the proper proportions of the three basic colors, red, blue and green, the present invention contemplates three picture fields per picture. Therefore, when the filter sheet 22 is shifted in synchronism with the three fields, the sequential fields of each picture will be presented respectively, through a red, blue and green filter. This may be accomplished by applying the proper motions to the lens plate 22. This motion may be effected by means of electric motors and appropriately shaped cams, or these motions may be applied by linear stroke solenoids driven by voltages having such wave forms as to impart the desired mechanical motions to the lens plate. This second method employing solenoids is preferred for illustration, and is instrumented as follows:

In Fig. 5 the lens plate 22 of the type previously described, is supported on a single anti-friction slide bearing 31. It is held in a stable position of equilibrium by four compression springs 32, 33, 34 and 36. Four solenoids 37, 38, 39 and 41 each having respective plungers adapted for rectilinear movement which are connected by suitable bearings to the four corners of the plate in such manner as to apply force to move the plate bodily in a sidewise direction. The two upper solenoids 37 and 38 are paired electrically so that when one pushes the other pulls the attached plate, thus aiding in their forces applied to the plate. Similarly, the two lower solenoids are paired to combine their forces in the same sense. The electrical actuating circuit is arranged so that the upper and lower pairs of solenoids are separately actuated. In order to permit relative transverse movement between the plungers and the lens plate 22, the bearing connecting each solenoid to the plate 22 is verticaly elongated to permit a vertical component of relative movement. These vertical elongations are indicated at 42, 43, 44 and 46.

In order to permit the employment of alternating current for energizing the solenoids 42, 43, 44 and 46, the latter must be capable of distinguishing between positive and negative current, and they therefore must be polarized either by the use of permanently magnetized cores or by the use of direct current polarizing windings, in this example, the permanent magnet cores being preferred.

In selecting the type of motion required of the solenoids, it would appear from Fig. 4 that the lens plate 22 must remain stationary in the position drawn until the end of the red field, when it must move instantaneously to the blue field position, then at the end of the blue field must move instantaneously to the green field position, and at the end of the green field must return instantaneously to the red field position. The difficulty of this apparent requirement for instantaneous movement is avoided by taking advantage of the fact that at any instant only one small spot of the image plane is illuminated as previously mentioned. The method employed is to tilt the lens plate 22 slightly relative to the filter, and to change the degree and sense of tilt during the movement of the plate, resulting in a rocking motion, in the following manner.

In Fig. 6*a* there is schematically illustrated a section of the filter with the horizontal dimensions of a single group of red, blue and green strips exaggerated. The rectangle 47, slightly smaller than the red strip R, represents the narrow focal area of the corresponding cylindrical lens projected upon that strip at an instant when the scanning beam of light is at the position 19. As the scanning beam scans successively lower horizontal lines it eventually reaches the bottom of the red strip preparatory to flying back to the top. After it has flown back, however, it must start on the blue strip B. In order to facilitate the movement of the cylindrical lens to this position in front of the blue filter strip, the movement of the upper end of the cylindrical lens is commenced while the lower end is still superposed on the red strip. This is accomplished by actuating the upper pair of solenoids 37 and 38, Fig. 5, to move the upper edge of the lens plate 22 toward the left, as shown in Fig. 6*b*, while the lower edge is still held at its furthest right position. It has been found that a lag of one-half of the period of one color field of the lower edge of plate 22 behind the upper edge produces a satisfactory result. The result is illustrated in Fig. 6*b*, in which the light spot 19 is at the bottom of the red strip and the focal area 47 of the cylindrical lens is in position at its upper end for the commencement of the blue field. A similar situation exists at the commencement of the green field. At the end of the green field time period the upper end of the cylindrical lens focal area 47 must be in position on the red strip, ready for the next scan, as illustrated in Fig. 6*c*. This necessitates a more rapid movement of the lens plate 22 to the right then to the left, and eliminates the possibility of using simple harmonic motion. The apparent solution of using a sawtooth motion is not satisfactory because the rapid accelerations and decelerations involved would cause mechanical noise, and it is necessary to employ motion that provides quiet operation. It has been found that a horizontal motion of the upper end of the cylindrical lens focal area described by the equation $$y_u = K\ (\sin wt - \tfrac{1}{2} \sin 2\ wt) \qquad (1)$$

produces a satisfactory result. In this equation $y_u$ represents horizontal displacement of the upper end of the focal area from its mean position and $t$ represents time, K being a constant. The basic frequency of 48 complete 187-line three color pictures per second is represented in radians second by $w$. On this basis the horizontal displacement of the lower end of the focal area $y_L$ lags by 60° or $$\frac{\pi}{3}$$

so that the equation for the lower end becomes $$y_L = K\left[\sin\left(wt - \frac{\pi}{3}\right) - \tfrac{1}{2}\sin 2\left(wt - \frac{\pi}{3}\right)\right] \qquad (2)$$

A composite plot of the motions of the top of the focal area, of the bottom of the focal area and of the illuminated spot 19 is depicted in Fig. 7. The curve 49 represents the relation between time and the horizontal motion of the top of the focal area, and curve 51, exactly the same in shape but retarded in phase by 60°, represents the same relation of the bottom end of the focal area. It is obvious that at the beginning of the red field period the light spot 19 is at the top of the viewing screen and the lens plate 22 and therefore is at the point 52. Similarly at the end of the red field period the light spot 19 is at the bottom and therefore is at the point 53. Plotting the intervening positions of the light spot 19 results in the graph 54. At the end of the red field period the spot 19 flies back to the top of the lens plate 22 and starts scanning the blue filter strip. Its position is therefore represented by the point 56, and in a similar manner the remainder of the light spot curve comprising branches 57 and 58 is plotted. The operation is such that there is an area or zone of coincidence between the travelling area or zone of luminosity on the video tube 11 and the filter elements of one color throughout one scansion or picture field.

Thus the graph shows that the light spot 19 falls at all times on the correct filter strip while the lens plate motion is simple and has the lowest possible values of acceleration.

In order to facilitate movement of the lens plate 22 and to reduce the power required it is desirable to make the mechanical system, comprising the effective inertia of the lens plate and the spring system including springs 32, 33, 34 and 36, have a suitable resonant frequency. This resonant frequency may, for example, approximate 96 cycles per second. This will greatly facilitate the operation of the lens plate 22 at that frequency, and will not interfere with operation at the fundamental frequency of 48 cycles per second, which also is contained in the equations. In some mechanical systems damping will be required, which can be supplied by the provision of viscous liquid dash pots, or in most cases more simply by partly embedding the retractile springs 32, 33, 34 and 36 in felt in a manner well known in the art.

The circuits for driving the solenoids of Fig. 5 so that their mechanical outputs are in accordance with the Equations 1 and 2 employ conventional components and are energized by 48 C. P. S. pulses derived in conventional and well-known manner from the "red notch" transmitted by the color television transmitter. These circuits are indicated in Fig. 8. A 48 pulse per-second signal is derived and transmitted through conductor 59 from conventional circuits in the color television receiver 61. The signal is passed through an adjustable delay device 62 that may, for example, be a delay multivibrator. From the delay device the signal is divided and applied to a 48 C. P. S. sine wave oscillator 63 that is controlled in both synchronism and phase by the pulse signal. The pulse signal is also applied to a second sine wave oscillator 64 having the frequency of the second harmonic or 96 C. P. S. The outputs of oscillators 63 and 64 are mixed in the resistor 66 and the output containing the fundamental and second harmonic frequencies in the desired proportions are applied from slider 67 to an amplifier 68 then to the output terminal 69 for energizing the upper solenoids 37 and 38 of Fig. 5 resulting in motion in accordance with Equation 1. The output voltages of oscillators 63 and 64 are also passed through 60° and 120° phase delay circuits 71 and 72 in order to provide a composite voltage for energizing the lower solenoids 39 and 41. The composite voltage is produced in the mixing resistor 73. After amplification in amplifier 74 this resultant voltage is supplied to the output terminal 76 for energizing the lower solenoids 39 and 41 of Fig. 5, resulting in motion in accordance with Equation 2.

It is to be noted that the motions, mathematically defined in Equations 1 and 2 are effected by complex voltages which are the combinations of two sinusoidal voltages, one of which is the second harmonic of the other. In this case one of the elements, such as the filter, is stationary while the other moves. In an alternative arrangement, one of the sinusoidal voltages could be used to oscillate one of the elements, such as the lens plate while the other voltage is used to oscillate the filter to produce similar relative movement between the elemnts in accordance with principles well understood in the art.

In the second embodiment of the invention illustrated in Figs. 9 to 12, inclusive, the color filter system contains groups of circular colored dots or areas instead of the vertically elongated colored strips of the previous embodiment. The lens plate 22′ is placed adjacent the filter system and includes a large number of small condensing lenses instead of the cylindrical lenses previously described. The filter arrangement may be varied but preferably the color filter comprises a plurality of groups of translucent filter elements of the three primary colors, red, blue, and green. The arrangement being such that the color phase or sequence is in the order named.

Figure 9:
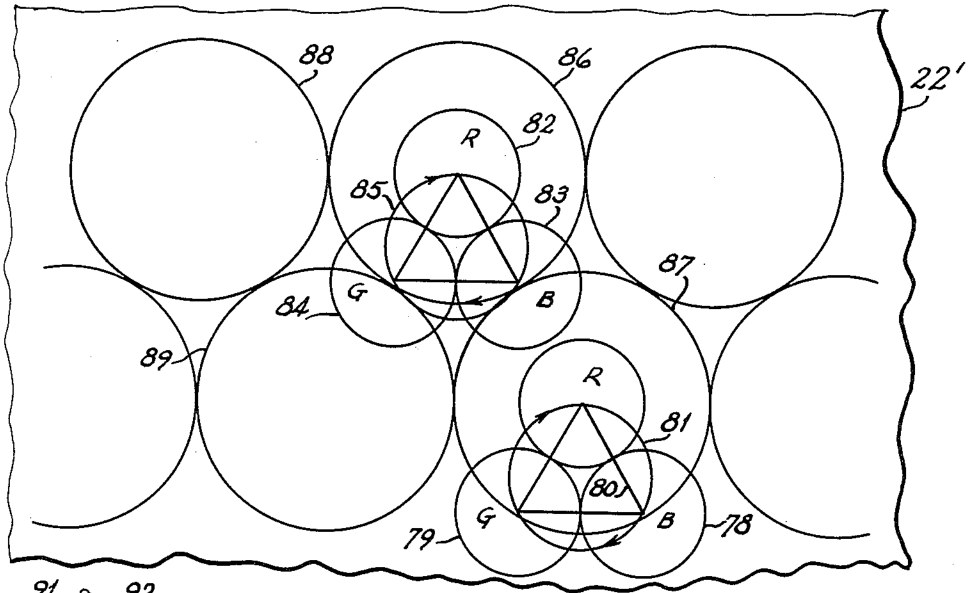

In Fig. 9 there is illustrated a blown-up section of a small portion of the light filtering arrangement, which latter includes both the light-controlling assembly or lens plate 22′ and the filter assembly or filter sheet. It will be noted that the lens plate 22′ has a plurality of closely spaced lenses some of which are indicated by the numerals 87, 88, and 89. As shown in the drawing, these lenses are contiguous to each other and therefore, must be in staggered relation. The small remaining area between the edges of the lenses is opaque. As will be more apparent from the subsequent description, the lens plate 22′ is adapted to be moved by special mechanism whereby the centers of each of the lenses move in circular paths illustrated by the circle 85, for example, which indicates the path of movement of the center of lens 86. Likewise the circular path of movement of the lens 87 is represented by the circle 81.

Figure 10:
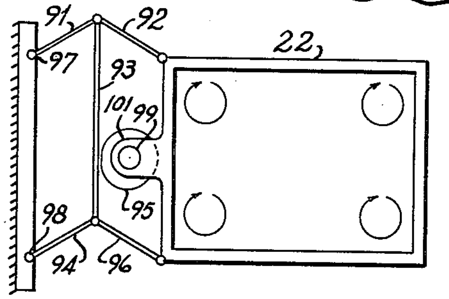

The lens plate 22′ may be mounted in any conventional manner, similar to the manner of mounting vibration test machines and shaking tables to permit circular motion. For example, a simple pantographic suspension as illustrated in Fig. 10 may be employed using five jointed rods, 91, 92, 93, 94 and 96 secured to a rigid support at 97 and 98. A 48 C. P. S. motor 95 having a constant speed drives the lens plate 22′ by means of an eccentric on the motor shaft fitted into a circular recess 99 in a bracket 101 attached to the lens plate 22′. Alternatively, the lens plate 22′ may be conventionally secured in a central position by springs bearing against its four edges, in which case the motor drive must be applied at two diametrically opposite points to secure the same circular translation at all points in the lens plate.

The voltage to drive the motor 95 is secured from a conventional electronic oscillator (not shown) synchronized by 48 C. P. S. pulses derived from the television receiver 48 C. P. S. component of the vertical synchronizing pulses, and provided with a phase changer (also not shown) for adjustment of the phase of circular motion of the lens plate 22 relative to the time phase of the television signal.

Another way in which the lens plate 22′ can be driven is by means of four or eight solenoids applied orthogonally, one set being supplied with current proportional to the sine of the angle of translation and the other set supplied with current proportional to the cosine of the same angle, the combination resulting in circular motion.

For reasons which are hereinafter pointed out, the lens plate 22′ has one lens for each group or series of filter elements representing the primary colors red, blue and green. The lens plate 22′ is associated with the filter sheet so that each lens is focused successively through each one of a respective associated group of filter elements.

The light filter assembly or sheet comprises a plurality of groups of selected and independent translucent filter elements representing the primary colors red, blue and green and in Fig. 9 these are represented by the circles 77, 78, and 79 which are also marked respectively R, B and G. The centers of these circular colored areas or dots define an equilateral triangle, for example, triangle 80 in the circumscribed circle 81 which also indicates the path of circular movement of the lens 87 as previously mentioned. Another filter group is composed of the circular colored areas or dots 82, 83 and 84. The relative positions of the elements of the filter groups with respect to the filter assembly sheet are not all in the same attitude or color phase. This does not show on the enlarged sectional view of Fig. 9 but is indicated in the segmented view of Fig. 12. It will be clear from this view that the filter elements are arranged in repeating triangular groups with all of the groups in the respective horizontal rows having the same phase. However, progressing from top to bottom the color phase of the filter element groups of the horizontal rows are progressively advanced by an equal amount and the progression is so distributed between the intervening rows that there is a color phase advance of 120° between the top and the bottom rows. This is clearly indicated in Fig. 12 where it will be seen that all of the red filter elements R in the top row are in the uppermost or zero phase position while in the bottom row the red filter elements have been advanced by 120° in the clockwise direction. In the center row the red filter elements are advanced 60° in the clockwise direction from the zero position. Because of the relative circular movement between the lens plate 22′ and the filter sheet 21′ the progressive advance of the color phase in the different horizontal rows is necessary so that the area of luminosity on the face of the cathode ray tube 11 during one field scansion will maintain coincidence with the dots or areas of one color throughout one picture field and the coincidence will shift sequentially to the filter elements of the other two colors during the succeeding respective picture fields after which coincidence will be reestablished with the filter dots or areas of the first color. Therefore, effectively, there is a tracing zone of coincidence between the luminescent area of the cathode ray tube screen, one of the lenses and one of the dots of one color in repeated sequence.

Because of the bi-dimensional orthogonol scansion of the electron beam and the area of luminosity on the screen of the cathode ray tube with the vertical sweep frequency much less than the horizontal sweep frequency, and because the speed of relative rotational movement of the lens plate 22′ and filter sheet 21′ is a function of the vertical sweep, the scansion path of the electron beam and the luminous area on the face of the tube 11 traces through the centers of the filter elements of one color during the reciprocations of one picture field, and successively through the centers of the filter elements of the other respective primary colors to complete one picture frame, after which the action is repeated. This causes successive picture fields of each picture frame to represent, respectively, the color component values of the primary colors, which when superimposed in one picture frame simulates the object field.

Figure 12:
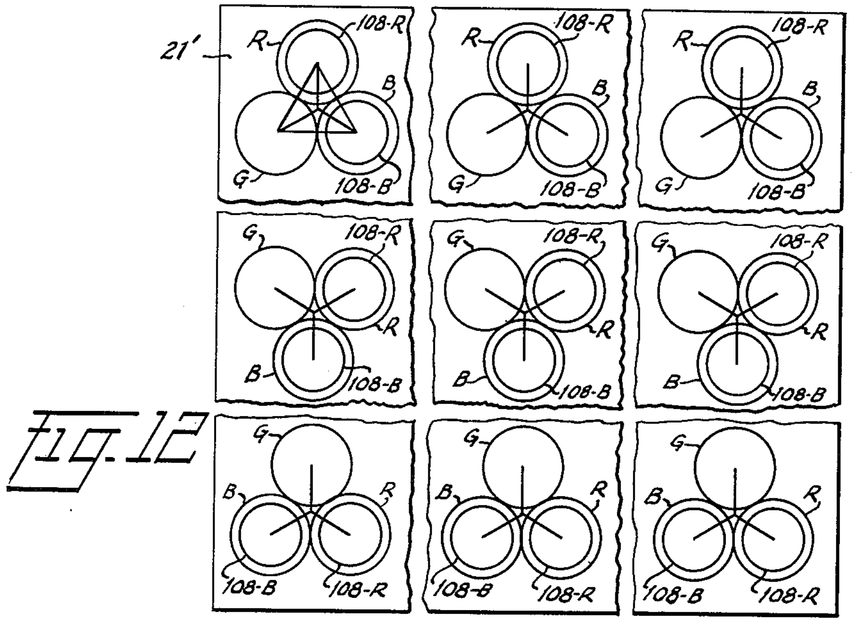
Figure 11:
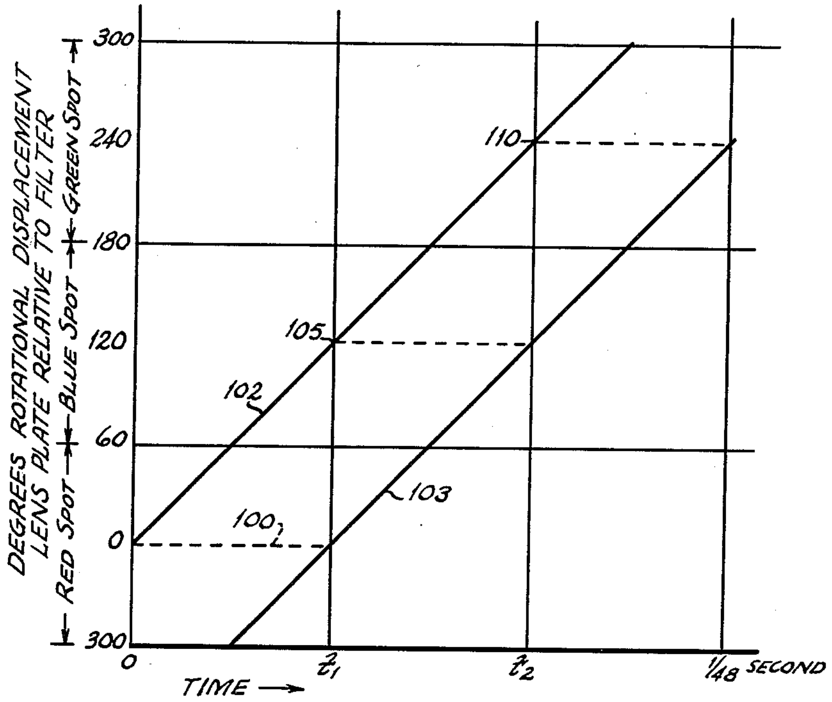

The manner in which the elementary area of luminosity on the cathode ray tube screen progresses with respect to the filter sheet 21′ so it coincides at all points with the circular areas of the one color during one vertical scan and then returns to the top and commences the next vertical sweep in coincidence with the next color element is illustrated in Fig. 11. In this figure the abscissae represent time and the ordinates represent angular displacement of the lenses of the lens plate 22′ with respect to the filter elements of the filter sheet 21′. The line 102 represents the position of the optical axes of all of the lenses in the topmost row, where zero degrees is taken as the uppermost point of its circular path. This zero position is indicated by the position of the red filters as shown in Fig. 12. The line 103 represents the displacement of the optical axes of the lenses in the bottom row of the lens plate 22′ and is shown as being retarded 120° behind the phase represented by the line 102. Therefore, starting at zero degrees and zero time, the line 102 represents the axes of the lenses in the top row which coincide, respectively, with their associated red dots in the upper row of the filter sheet 21′. As time progresses the zone of coincidence, which approaches a line, progressively moves down in synchronism with the vertical scanning sweep of the electron beam and the area of luminosity of the screen. The circles 108–R indicate the spot of light focused through the red filter dots by the associated lens in the lens plate 22′, during the first field scansion of a picture frame.

At the end of the first vertical scansion the spot of light flies back to the top row but because of the relative rotation between the lens plate 22′ and the filter sheet 21′ the spot now designated 108–B will be focused on the blue filter elements during the next vertical scansion and represents the second picture field. The beginning of this scansion and picture field is indicated at instant *t*, in Fig. 11. Similarly, at the end of the second vertical scansion, the spot of light flies back up to the top row where it is now focused on the centers of the green filter elements the traveling spot of light now being indicated at 108–G, during the third scansion field. This completes the picture frame and because of persistence of vision of the human eye the picture frame will have superimposed color values the composite of which simulates the object field.

It should be clearly understood that the advance of the color phase is gradual and uniform between the horizontal rows from top to bottom so that there is no apparent unsteadiness, and the change in coincidence between the flying light spot and the filter elements of one color and the next one takes place during the flyback interval of video tube 11. Accordingly, the phase change indicated in Fig. 11 by the vertical separation between lines 102 and 103 is effected by the gradual change in relative circular movement between the lens plate and the filter sheet and the relative positioning of the filter dots in the groups.

Although the embodiments shown for the purpose of illustrating the inventive concept relate to a projection type television system, it is to be understood that the invention is also applicable to direct vision video systems. For example, in the embodiments illustrated the light-directing elements are condensing lenses for the purpose of concentrating the light from the area of luminosity on the screen of the video tube, the lenses being so positioned with respect to the filter elements that the beam of light is focused thereon. However, it should be clear that in a direct viewing system other types of light-directing elements could be used such as apertures in a mask.

The salient feature of the present invention is the cooperative arrangement of the light-directing elements with the filtering elements so that there is produced a travelling zone of coincidence between the light-directing element or elements and the filter elements of one color of the respective primary colors directing the respective sequential picture fields of each picture frame. Each picture frame is made up of a composite of picture fields of the respective primary colors with a cyclic repetition in synchronism with the picture frames.

In addition to the embodiments shown, wherein the first, the lenses or light-directing elements each have an aperture which is equal to the combined width in a horizontal direction of the three filter elements of the associated group of primary color filter elements, and in the second, where the lenses move with respect to the filter assembly in a circular path which corresponds to a circle through the centers of associated group of circular filter elements of the primary colors other modified forms could be used. For example, instead of the filter elements being arranged at the apices of triangles they may be arranged in a straight line inclined to the orthogonal axes along which the scansion of the traveling luminous area of the video screen tube takes place. With this latter type of arrangement the relative movement between the light-directing elements and the filter elements would need be only vertical reciprocating motion in synchronism with the vertical sweep of the video tube.

Accordingly, it will be clearly understood that various modifications may be made without departing from the scope of the invention as set forth in the accompanying claims.

What is claimed is:

1. In a color television projection receiver, a color separation filter optical system for cyclically changing the color filter in sequential field periods of time comprising, a projection picture viewing screen having an image surface for reception of a scanning image-bearing beam of light from said television receiver, a translucent color filter sheet containing a selected number of similar groups of colored elements, each group being substantially equal in one dimension to the width of the picture element and each of said groups containing at least three primary color elements, said filter sheet being positioned in said beam of light adjacent to said image surface, a lens plate in said beam of light having one lens for each group of primary filter elements, said lenses being focused through said color filter onto said image surface, each of said lenses being associated with a specific one of said groups of color elements, means for imparting relative oscillatory movement between the respective adjacent ends of said lens plate and said filter sheet, the waveform of the oscillatory movement between the respective adjacent ends being identical and being a combination of a fundamental sinusoid and its second harmonic, the oscillatory movements being displaced in phase by substantially 60°.

2. In combination in a television receiver system, a cathode ray tube having means for orthogonally scanning a luminous screen for producing a flying spot of light moving cyclically and modulated to produce picture elements, the motion and modulation of the spot of light during one scanning cycle producing one picture field, a light filter system comprising groups of strip-like color filter elements of selected color components repeated horizontally, a light directing element for each group of filter elements, said light directing elements being assembled to move in unison, and means for producing relative periodic oscillatory movement between the respective adjacent upper ends of said light directing elements and the ends of said filter elements in accordance with a periodic motion which is the combination of a fundamental sinusoid and the second harmonic thereof and means for producing relative periodic oscillatory movement between the respective adjacent lower ends of said light directing elements and said filter elements which latter movement is identical with said first relative oscillatory movement but is delayed in time phase by substantially 60°.

References Cited in the file of this patent

UNITED STATES PATENTS

| | | |
|---|---|---|
| 2,479,820 | DeVore | Aug. 23, 1949 |
| 2,538,071 | Young | Jan. 16, 1951 |
| 2,602,854 | Bedford | July 8, 1952 |
| 2,617,875 | De Forest | Nov. 11, 1952 |

FOREIGN PATENTS

| | | |
|---|---|---|
| 589,345 | Great Britain | June 18, 1947 |